Patented Sept. 26, 1950

2,523,996

UNITED STATES PATENT OFFICE 2,523,996

GLASS-SAND TREATMENT

James P. Poole, State College, Pa., assignor to Brockway Glass Co., Inc., Brockway, Pa.

No Drawing. Application September 20, 1947, Serial No. 775,366

1 Claim. (Cl. 241—14)

This invention relates to a method of improving the quality of sand for use in ceramic industries and otherwise.

In making glass and pottery, it is necessary, according to practices presently prevailing, to use as a starting material sand of sufficient purity and fineness for the desired purpose. It is accordingly usually necessary to transport sand to the glass or pottery plant from various distant locations and the bulk of the sand compared to its unit cost makes such shipment a very considerable item.

Certain local sandstone deposits have heretofore been regarded as unusable because of their lack of purity and particle size. Merely reducing the particle size, as by impact grinding, is not a satisfactory solution since the particles have limonite surface stains which remain after crushing and are not removable by any commercially practical method heretofore known.

I have found a method of treating these low grade local sandstone deposits which renders them usable in the ceramic industry. The sandstone to be treated is a soft, friable, easily crushed material and the sand particles which make up the rock are about 30 to 50 mesh in size. These particles are cemented together by a ferruginous clay bond which is readily broken. Thus the quarrying and crushing operations present no particular problem.

However, to produce a material for making flint glass, for example, it is essential that the sand be of high purity. Iron is present in the unprocessed sandstone in considerable quantity (.120% $Fe_2O_3$). In order for this material to be usable as a flint glass raw material, the iron content must be reduced to .025% $Fe_2O_3$ or less.

The iron present in this sand is found mainly in the clay bond and as a stain on the surface of the particles. The iron from the clay is easily removed by washing the crushed stone. The remaining iron present as a limonite stain is not so easily disposed of. I have found that it can be be removed in the laboratory by acid leaching, but this is commercially impractical for economic reasons. Normal scrubbing and attrition processes have been unsuccessful.

I have found a novel method which simultaneously frees the limonite surface stain from the particles and reduces the particle size to a range generally usable in glass making and related ceramic fields. Impact grinding in pebble mills is known, but this merely subdivides the particles without affecting the limonite surface stain. Impact grinding is practiced with pebbles about two inches in diameter and a sand to pebble charge ratio of about 3 to 8.

According to my invention sand is treated by what may be called an attrition grinding method, as distinguished from impact grinding. A conventional Jasper lined pebble mill is charged with ¾" pebbles and a sand to pebble ratio of about 1.1 to 8. The mill is about half-full of pebbles and sand in the ratio specified just about fills the voids in the pebbles. In turn, water is added until it just reaches the upper surface of the pebbles and sand.

Grinding by attrition in this manner is found to remove the penetrating limonite stain on the quartz particles by actually rubbing away the surface of the particle. The stained portion is thus reduced to a slime which may be removed by washing and classifying treatment. The particle size difference between the cleaned fine sand and the iron bearing slimes is so great that no difficulty is encountered in the classifier separation.

Attrition grinding in the manner herein set forth results in a product which is 95% minus 150 mesh. I have practiced my invention with Fall's Creek sandstone, but the same method is applicable to other sandstones having similar characteristics.

The screen analysis of Fall's Creek sand beneficiated by the foregoing method is as follows:

Retained on— Per cent
140 mesh _____ .3
170 mesh _____ 1.1
270 mesh _____ 54.1
325 mesh _____ 11.3
400 mesh _____ 7.5
Through 400 mesh _____ 26.5

Chemical analysis of sand before and after beneficiation by my present method is as follows:

|  | Before | After |
|---|---|---|
| $SiO_2$ | 98.75 | 99.4 |
| $Fe_2O_3$ | .120 | .016 |
| $Al_2O_3$ | .67 | .07 |
| $TiO_2$ | .104 | .45 |

Good sandstone which does not require beneficiation, for instance the Mapleton sandstone found in Pennsylvania, will approximate the composition given above for poor sandstone beneficiated by my present method, excepting that $Fe_2O_3$ will run up to .025.

Treated material discharges continuously from the pebble mill and is classified. The plus 150 mesh material is returned to the pebble mill and the minus 150 mesh goes to a conventional hydro separator where the slime is washed out. The product is then processed successively in a rake classifier and a filter where the water content is reduced to 25% and 15%, successively. Nearly all of the remaining water is removed in a conventional drier.

Since my attrition grinding method has an overall tonnage loss of only about 20% (375 tons of quarried sandstone yielding 300 tons of final product) there probably is, in addition to the attrition removal of the surface of the sand particles, some degree of particle subdivision in my novel pebble mill treatment. However that may be, treatment of the sand in a pebble mill with the unusually small pebbles herein specified and the unusually small amount of sand charge to pebble charge gives a new result not hitherto known and permits practical use in glass making of a material hitherto considered worthless for that purpose.

What is claimed is:

The method of treating glass-making sand of approximately 50 mesh and having tenacious surface impurities which comprises wet grinding in a pebble mill wherein the pebbles are of the order of three-fourths of an inch in diameter, the water approximately reaches the upper level of the charge, the charge is approximately half the capacity of the mill, and the ratio of sand charge to pebble charge is of the general order of 1 to 8, for a period of time sufficient to separate the surface impurities from the particles as slime by attrition of the particles and the particle size is reduced to approximately 150 mesh and finer.

JAMES P. POOLE.

REFERENCES CITED

The following references are of record in the file of this patent:

UNITED STATES PATENTS

| Number | Name | Date |
| --- | --- | --- |
| 1,860,811 | Little | May 31, 1932 |
| 1,932,741 | Kramer | Oct. 31, 1933 |
| 2,106,888 | Earle | Feb. 1, 1938 |
| 2,122,217 | Sisson | June 28, 1938 |
| 2,212,641 | Hucks | Aug. 27, 1940 |
| 2,232,696 | Earle | Feb. 25, 1941 |
| 2,290,686 | Horsfield | July 21, 1942 |
| 2,331,102 | Bird | Oct. 5, 1943 |

FOREIGN PATENTS

| Number | Country | Date |
| --- | --- | --- |
| 4,903 of 1912 | Great Britain | Feb. 27, 1913 |

OTHER REFERENCES

Handbook of Mineral Dressing, by A. F. Taggart. Published by John Wiley & Sons. Patent Office designation TN 500 .T3 1945. Sec. 5, pp. 27, 31 and 103; Sec. 7, pp. 08 and 09. (Copy in Div. 25.)

Modern Core Practices and Theories, by H. W. Dietert. Published 1942 by American Foundryman's Association, 222 West Adams St., Chicago, Illinois. Patent Office designation TS 236 .D53, page 5. (Copy in Div. 3.)

Milling Methods 1930. Transactions of A. I. M. & M. E. Published by the Institute at the Office of the Secretary; 29 W. 39th St., New York, N. Y., 1930. Pages 51–81. (Copy in Div. 25.)